United States Patent
Wenger

(10) Patent No.: US 9,075,438 B2
(45) Date of Patent: Jul. 7, 2015

(54) SYSTEMS AND RELATED METHODS INVOLVING STYLUS TACTILE FEEL

(75) Inventor: Scott Wenger, Raleigh, NC (US)

(73) Assignee: HTC CORPORATION, Taoyuan County, Taoyuan (TW)

( * ) Notice: Subject to any disclaimer, the term of this patent is extended or adjusted under 35 U.S.C. 154(b) by 76 days.

(21) Appl. No.: 13/551,822

(22) Filed: Jul. 18, 2012

(65) Prior Publication Data

US 2014/0022217 A1    Jan. 23, 2014

(51) Int. Cl.
G09G 5/00 (2006.01)
G06F 3/01 (2006.01)
G06F 3/041 (2006.01)
G06F 3/0354 (2013.01)

(52) U.S. Cl.
CPC ............... *G06F 3/016* (2013.01); *G06F 3/041* (2013.01); *G06F 3/0416* (2013.01); *G06F 3/03545* (2013.01)

(58) Field of Classification Search
CPC . G06F 3/0654; G06F 3/03545; G06F 3/0317; G06F 3/016; G06F 3/041; G06F 3/0416
USPC ............ 345/156, 173–179; 178/18.01, 19.01, 178/20.01, 19.03
See application file for complete search history.

(56) References Cited

U.S. PATENT DOCUMENTS

| | | | | |
|---|---|---|---|---|
| 4,667,182 A | * | 5/1987 | Murphy | 340/407.2 |
| 6,005,200 A | * | 12/1999 | Stanchak et al. | 178/19.01 |
| 7,755,607 B2 | * | 7/2010 | Poupyrev et al. | 345/156 |
| 2009/0079703 A1 | * | 3/2009 | Kyung et al. | 345/173 |
| 2013/0106741 A1 | * | 5/2013 | Pedersen et al. | 345/173 |
| 2013/0106765 A1 | * | 5/2013 | Beecher et al. | 345/174 |
| 2013/0215079 A1 | | 8/2013 | Johnson et al. | |

FOREIGN PATENT DOCUMENTS

| | | |
|---|---|---|
| TW | M363640 | 8/2009 |
| TW | 201020895 A | 6/2010 |
| TW | 201229854 A | 7/2012 |

OTHER PUBLICATIONS

Office Action for corresponding Taiwan application dated Apr. 13, 2015.

* cited by examiner

*Primary Examiner* — Jennifer Nguyen
(74) *Attorney, Agent, or Firm* — McClure, Qualey & Rodack, LLP

(57) ABSTRACT

Systems and methods involving stylus tactile feel are provided. In this regard, a representative system includes: a stylus operative to affect an input to an electronic device via interaction with a working surface thereof, the stylus being further operative to interact with the working surface such that electrostatic charges exhibited between the working surface and the stylus simulate friction force exhibited by the surface to be simulated and an instrument to be simulated, the instrument being represented by the stylus.

17 Claims, 4 Drawing Sheets

USE ELECTROSTATIC FORCE, EFFECTIVE AT A WORKING SURFACE AND A STYLUS, TO SIMULATE FRICTION FORCE EXHIBITED BY A SURFACE AND INSTRUMENT TO BE SIMULATED
FIG. 3
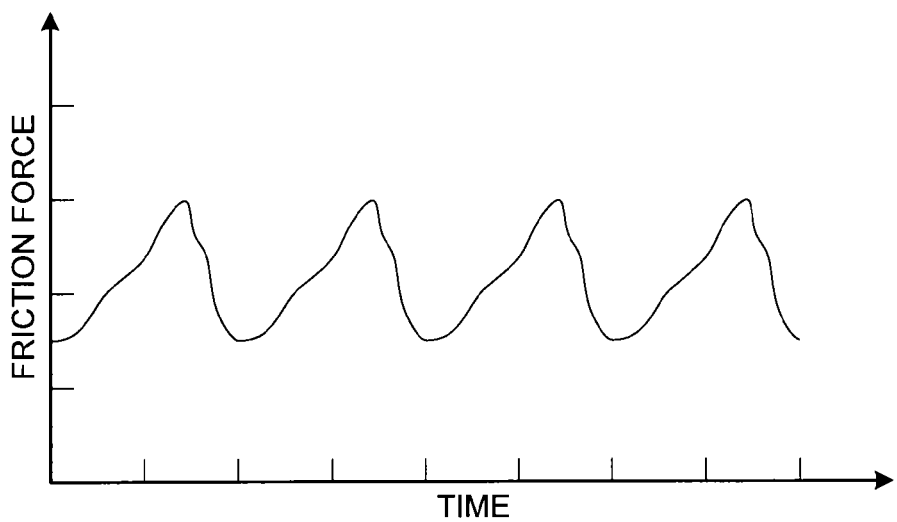
FIG. 4A
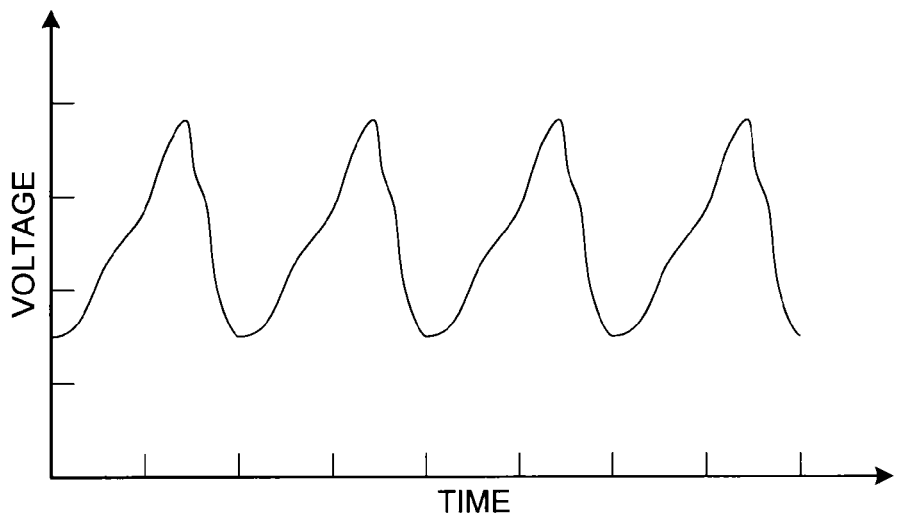
FIG. 4B

SYSTEMS AND RELATED METHODS INVOLVING STYLUS TACTILE FEEL

TECHNICAL FIELD

The present disclosure generally relates to stylus-type input devices.

BACKGROUND

An electronic device may use a range of input devices, such as a keyboard, a touchscreen and/or a stylus. Although the use of a stylus as an input device has met with some level of success over the years, a perceived drawback includes a lack of feedback to the user in the form of tactile feel. Notably, the working surface (e.g., a display screen) that is engaged by the tip of a stylus is typically flat and smooth, resulting in a feel to the user that is unlike many artistic media, such as paper or canvas, for example.

SUMMARY

Systems and methods involving stylus tactile feel are provided. Briefly described, one embodiment, among others, is a system for providing stylus tactile feel of a simulated surface using an electronic device, the system comprising: a stylus operative to affect an input to the electronic device via interaction with a working surface thereof, the stylus being further operative to interact with the working surface such that electrostatic charges exhibited between the working surface and the stylus simulate friction force exhibited by the surface to be simulated and an instrument to be simulated, the instrument being represented by the stylus.

Another embodiment is a system for providing stylus tactile feel of a simulated surface, the system comprising: an electronic device having a working surface; and a stylus operative to affect an input to the electronic device via interaction with the working surface, the stylus being further operative to interact with the working surface such that electrostatic charges exhibited between the working surface and the stylus simulate friction force exhibited by the surface to be simulated and an instrument to be simulated, the instrument being represented by the stylus.

Another embodiment is a method for providing stylus tactile feel comprising: using electrostatic force effective at a working surface of an electronic device and at a stylus to simulate friction force exhibited by a surface to be simulated and an instrument to be simulated, the instrument being represented by the stylus.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is a flowchart depicting an example embodiment of a method for providing stylus tactile feel.

FIG. 4A is a graph of force versus time depicting representative frictional force exhibited by engagement of a surface with an instrument.

FIG. 4B is a graph of voltage versus time of a representative charge profile for providing electrostatic force for simulating the friction force of FIG. 4A.

DETAILED DESCRIPTION

Figure 1:
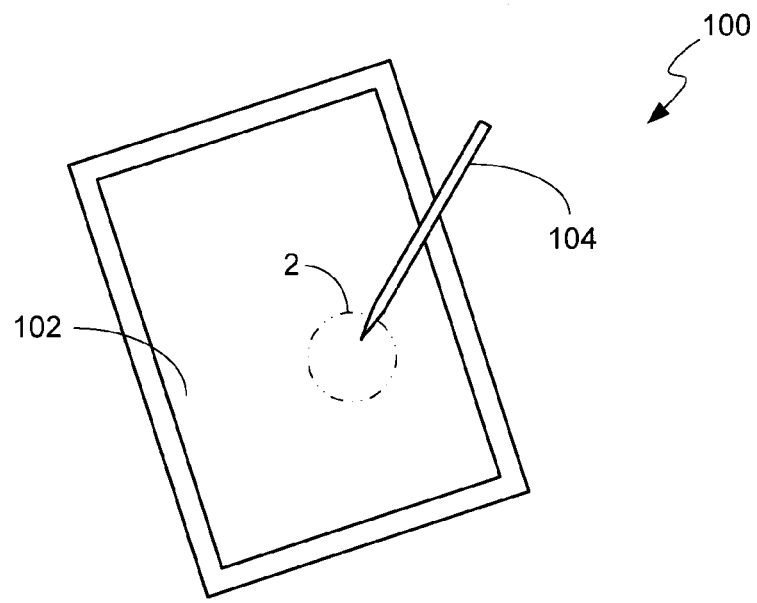
FIG. 1 is a schematic diagram of an example embodiment of a system for providing stylus tactile feel.

Having summarized various aspects of the present disclosure, reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure as defined by the appended claims.

In this regard, systems and methods involving stylus tactile feel are provided, embodiments of which use electrostatic forces between a working surface of an electronic device and a stylus to simulate friction forces typically exhibited by an instrument (such as a pencil or paintbrush, among others) that is used for marking a surface (such as paper or canvas, among others). In some embodiments, a time varying charge is applied to the stylus, which may be an active stylus, with the varying nature of the charge corresponding to a friction profile of the surface and instrument that are to be simulated. The polarity of the charge applied to the stylus is opposite to the charge that is applied to be effective at the working surface of the electronic device, such as at the touchscreen of a tablet computer, for example. In some embodiments, either or both of the working surface and the stylus may exhibit the time varying aspect of the charge.

In some embodiments, various charge profiles corresponding to multiple combinations of instruments and surfaces may be stored and available for selection by the user. In this manner, the experience of using a stylus as an input device may be readily customized to provide a feel that more closely emulates use of various instruments and media.

FIG. 1 is a schematic diagram of an example embodiment of a system for providing stylus tactile feel. As shown in FIG. 1, system 100 includes an electronic device 102 that is configured as a tablet computer. Note that, in other embodiments, various other configurations of electronic devices may be used. System 100 also includes a stylus 104 that may be used to provide input to device 102.

Figure 2:
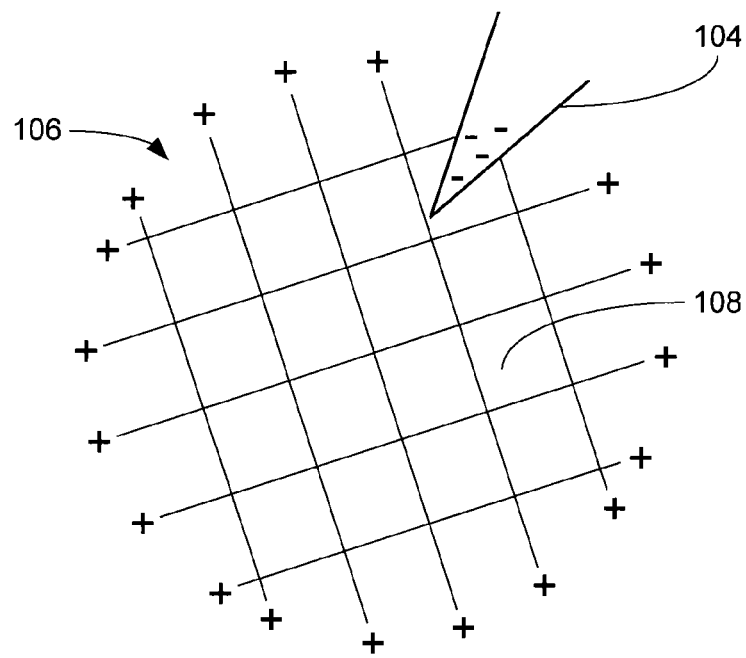
FIG. 2 is a schematic diagram showing detail of the embodiment of FIG. 1.

FIG. 2 is a schematic diagram showing detail of the embodiment of FIG. 1, in which it is shown that device 102 incorporates a grid 106 (e.g., a conductive grid) that is positioned beneath a cover 108 of the device. In this embodiment, the grid is operative to sense inputs by the stylus as well as by direct user input (e.g., via finger actuation of the touchscreen).

Also shown in FIG. 2 is a representative charge distribution about the grid and stylus. Note that the grid is depicted as being positively charged while the tip of the stylus exhibits a negative charge. Various other charge configurations may be used. For instance, the polarities of the grid and stylus may be reversed. It should also be noted that the polarities may be maintained or may alternate. That is, at a first interval the grid may be positive and the stylus negative, while at a second interval the grid may be negative and the stylus positive.

FIG. 3 is a flowchart depicting functionality that may be performed by a system, such as system 100 of FIG. 1. As shown in FIG. 3, the functionality (or method) involves using electrostatic force effective at a working surface of an electronic device and at a stylus to simulate friction force exhibited by a surface to be simulated and an instrument to be simulated (block 120). With respect to simulating a friction force, FIGS. 4A and 4B that follow are illustrative.

In this regard, FIG. 4A is a graph of force versus time depicting representative frictional force exhibited by engagement of a surface with an instrument. Note that in FIG. 4A, engagement of a selected surface (in this case, notebook paper) with a selected instrument (in this case, a ball point pen) exhibits a friction profile that includes various contours. For instance, the friction profile includes a characteristic amplitude and frequency.

FIG. 4B is a graph of voltage versus time of a representative charge profile for providing electrostatic force for simulating the friction force of FIG. 4A. As shown in FIG. 4B, the charge profile exhibits contours that resemble the characteristic amplitude and frequency of the friction profile. However, it should be noted that direct correspondence between the charge profile and friction profile may not be provided in some embodiments. Notably, the charge profile may be applied to one or both of the electronic device and stylus so that the desired electrostatic forces are present between the two during use. For instance, the charge profile may be applied to the grid of an electronic device such as grid 106 of the embodiment of FIG. 1. As stylus 104 is moved relative to the working surface 108, the time varying nature of the charge of the grid will cause the electrostatic force between the stylus and the working surface to vary resulting in a tactile feel that differs from the stylus moving across the smooth working surface.

Figure 5:
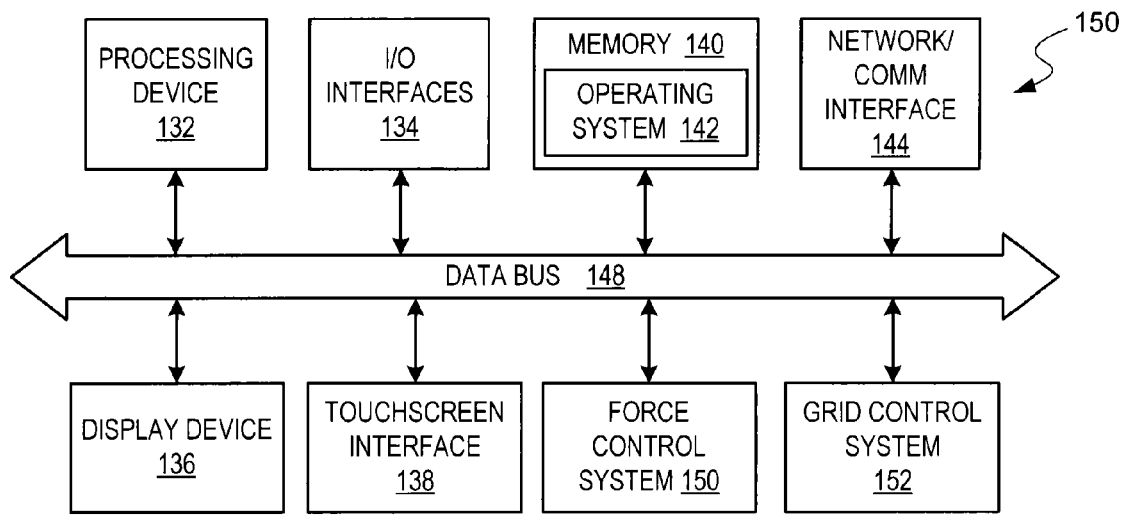
FIG. 5 is a schematic diagram of another example embodiment of a system for providing stylus tactile feel.

FIG. 5 is a schematic diagram of another example embodiment of a system for providing stylus tactile feel. Specifically, FIG. 5 depicts that portion of the system that involves functionality associated with selectively altering a charge profile. In this embodiment, the functionality is provided by an electronic device (e.g., a tablet computer, smartphone, etc.). However, in other embodiments, similar functionality may be performed by a stylus.

As shown in FIG. 5, electronic device 130 includes a processing device (processor) 132, input/output interfaces 134, a display device 136, a touchscreen interface 138, a memory 140, operating system 142, a network/communication interface 144, and a mass storage 146, with each communicating across a local data bus 148. Additionally, device 130 incorporates an electrostatic force control system 150 (which contains charge profile information) and a grid control system 152.

The processing device 132 may include a custom made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 140 may include any one of a combination of volatile memory elements (e.g., random-access memory (RAM, such as DRAM, and SRAM, etc.)) and nonvolatile memory elements. The memory typically comprises native operating system 142, one or more native applications, emulation systems, or emulated applications for any of a variety of operating systems and/or emulated hardware platforms, emulated operating systems, etc. For example, the applications may include application specific software which may comprise some or all the components of the system. In accordance with such embodiments, the components are stored in memory and executed by the processing device.

Touchscreen interface 138 is configured to detect contact within the display area of the display 136 and provides such functionality as on-screen buttons, menus, keyboards, softkeys, etc. that allows users to navigate user interfaces by touch. Notably, navigating via the touchscreen interface may facilitate various functions associated with displayed content items such as searching and downloading.

One of ordinary skill in the art will appreciate that the memory may, and typically will, comprise other components which have been omitted for purposes of brevity. Note that in the context of this disclosure, a non-transitory computer-readable medium stores one or more programs for use by or in connection with an instruction execution system, apparatus, or device.

With further reference to FIG. 5, network interface device 144 comprises various components used to transmit and/or receive data over a networked environment. By way of example, such components may include a wireless communications interface. When such components are embodied as an application, the one or more components may be stored on a non-transitory computer-readable medium and executed by the processing device.

In operation, electrostatic force control system 150 applies a charge to a grid of the electronic device for interacting with a charge of a stylus. In this embodiment, the grid is the same grid that is used by the device as a touchscreen sensor array. Notably, the grid control system, responsive to information indicating that the stylus is in proximity of the grid, disables the touchscreen array, which prevents further user inputs via conventional touchscreen interaction from being recognized. However, simultaneously (or nearly so), the grid is charged to exhibit a selected charge profile for simulating the friction force exhibited by the surface to be simulated.

If embodied in software, it should be noted that each block depicted in the flowchart of FIG. 4 (or any of the other flowcharts) represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

Figure 6:
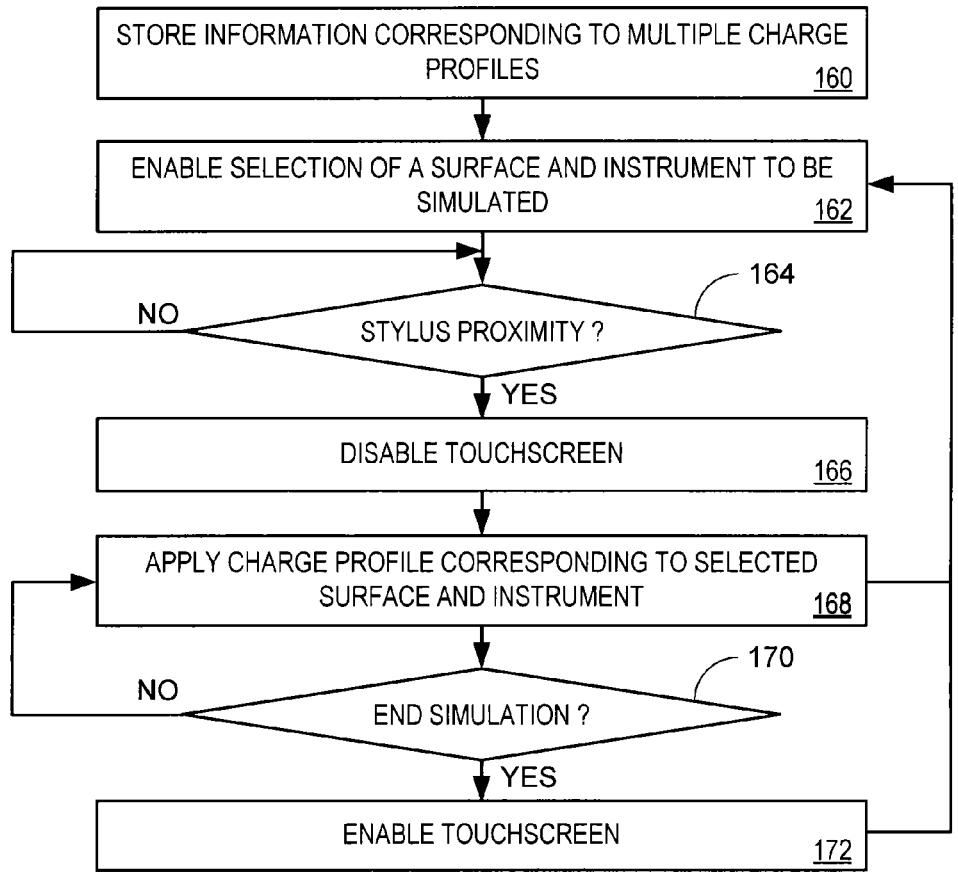
FIG. 6 is a flowchart depicting functionality that may be performed by an example embodiment of a system for providing stylus tactile feel.

FIG. 6 is a flowchart depicting functionality that may be performed by an example embodiment of an electronic device, such as device 140 of FIG. 5. As shown in FIG. 6, the functionality (or method) may be construed as beginning at block 160, in which information corresponding to multiple charge profiles is stored. Notably, the charge profiles correspond to friction profiles associated with different surface and instrument combinations that may be simulated with stylus tactile feel. In block 162, a user of the electronic device is enabled to select a combination of a surface and an instrument to be simulated. Then, as depicted in block 164, a determination is made as to whether the stylus is in proximity of the working surface of the electronic device. If it is determined that the stylus is not proximate the working surface, the process may return to block 164. If, however, it is determined that the stylus is proximate the working surface, the process may proceed to block 166, in which the touchscreen is disable, thereby disabling the touchscreen sensor array (or grid) of the electronic device. In some embodiments, disabling of the touchscreen is performed by a grid control system responsive to an input from an electrostatic force control system, which may also monitor proximity of the stylus.

As depicted in block 168, the charge profile corresponding to the selected combination to be simulated is applied so that a desired charge is effective at the working surface. Notably, an appropriate charge should also be applied at the stylus to provide the desired effect between the stylus and working surface. Thereafter, such as depicted in block 170, a determination is made as to whether the simulation is to end. If it is determined that the simulation should not end, the process may return to block 168, for example. If, however, the simulation is to end, the process may proceed to block 172, in which the touchscreen may be enabled. After block 172, the process may return to block 162, for example, in which a user may select another simulation.

Figure 7:
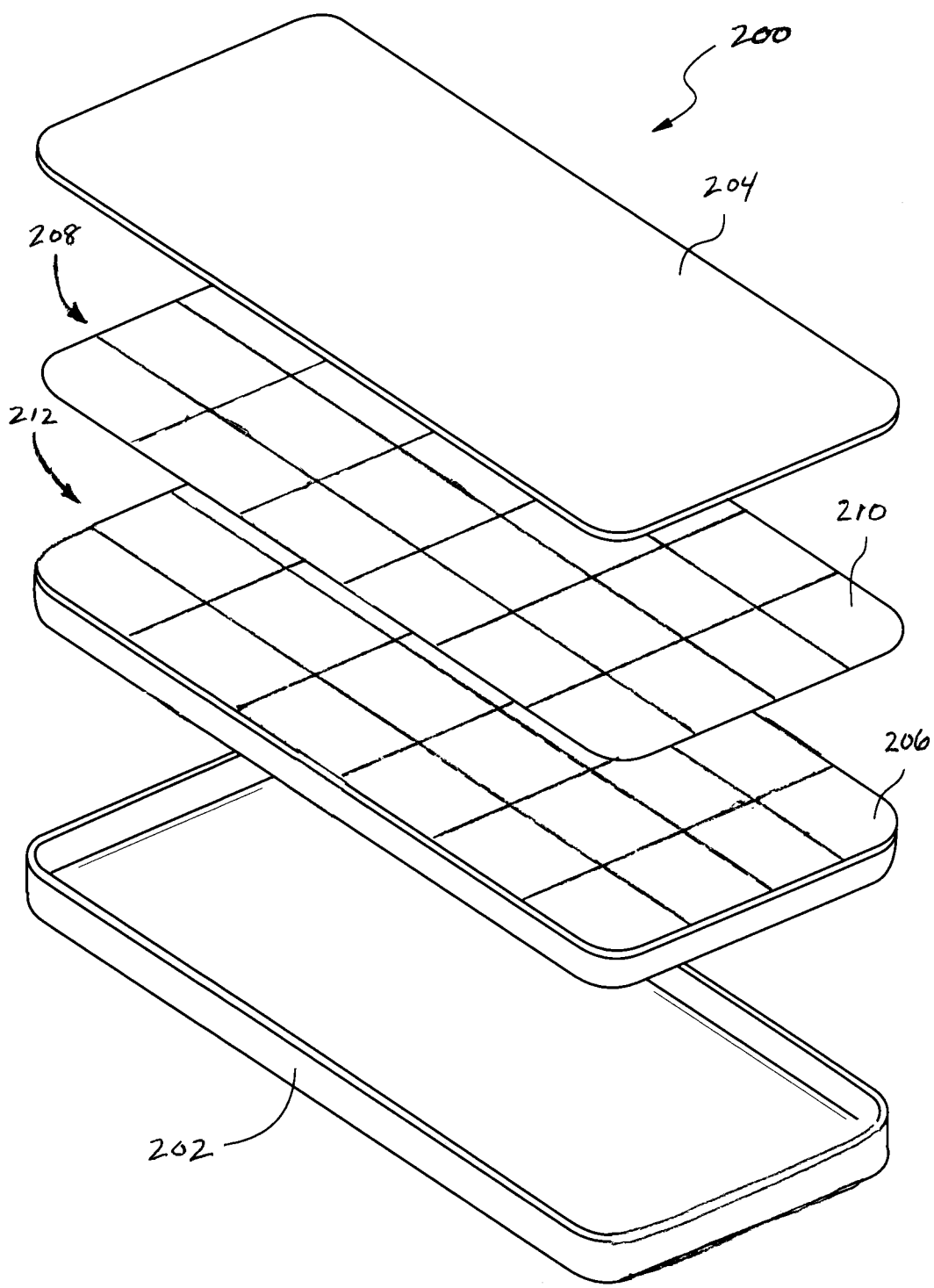
FIG. 7 is a schematic diagram of another example embodiment of a system for providing stylus tactile feel.

FIG. 7 is a partially-exploded, schematic diagram of another example embodiment of a system for providing stylus tactile feel. As shown in FIG. 7, electronic device 200 incorporates a housing 202, a cover 204, a touchscreen display 206 and a conductive grid 208. The housing and cover define an interior in which the various other components of the device (e.g., an electrostatic force control system (not depicted)) are located. In this embodiment, the cover provides the working surface that may be contacted by an associated stylus (also not shown).

In this embodiment, grid 208 is provided as a portion of a transparent layer 210 that is positioned between the display and the cover. The grid, of which only representative traces are depicted, may be formed of various materials, such as Indium Tin Oxide, for example. Note that the display also incorporates a grid (e.g., a capacitive grid 212), of which only representative traces are depicted, which may be formed of various materials for facilitating touchscreen functionality.

In operation, a charge profile is applied to grid 208 so that an electrostatic force is effective at the working surface of the device. As such, a stylus interacting with the working surface may be provided with a tactile feel that simulates friction force exhibited by a surface and an instrument to be simulated.

It should be emphasized that the above-described embodiments are merely examples of possible implementations. Many variations and modifications may be made to the above-described embodiments without departing from the principles of the present disclosure. By way of example, the systems described may be implemented in hardware, software or combinations thereof. All such modifications and variations are intended to be included herein within the scope of this disclosure and protected by the following claims.

At least the following is claimed:

1. A system for providing stylus tactile feel of a simulated surface using an electronic device, the electronic device having a touchscreen and a transparent layer overlying the touchscreen to provide a working surface, the transparent layer having a conductive grid, the system comprising:
   an active stylus operative to independently generate a first time-varying charge to interact with the conductive grid of the electronic device, the conductive grid exhibiting a second time-varying charge,
   the stylus being further operative to interact with the working surface above the touchscreen such that electrostatic force generated between the first time-varying charge on the stylus and the second time-varying charge on the conductive grid simulates friction force between the surface to be simulated and an instrument to be simulated, the instrument being represented by the stylus.

2. The system of claim 1, wherein the stylus is operative to generate the first time-varying charge of a time varying charge profile, having amplitude and frequency characteristics, for simulating the friction force responsive to the stylus being moved relative to the working surface.

3. The system of claim 1, wherein the stylus is operative to:
   store information corresponding to multiple charge profiles, each of which corresponds to a friction profile associated with a different surface to be simulated; and
   enable selection from among the multiple charge profiles such that the surface to be simulated or the instrument to be simulated is user selectable.

4. The system of claim 1, wherein the stylus is operative to selectively exhibit a change in polarity.

5. A system for providing stylus tactile feel of a simulated surface, the system comprising:
   an electronic device having a touchscreen and a transparent layer overlying the touchscreen to provide a working surface, the transparent layer having a conductive grid; and
   an active stylus operative to independently generate a first time-varying charge to interact with the conductive grid, the conductive grid having a second time-varying charge, the stylus being further operative to interact with the working surface such that electrostatic force generated between the first charge on the stylus and the second time-varying charge on the conductive grid simulates friction force between the surface to be simulated and an instrument to be simulated, the instrument being represented by the stylus.

6. The system of claim 5, wherein the stylus is operative to exhibit a charge that is opposite in polarity to a charge exhibited by the working surface of the electronic device.

7. The system of claim 5, wherein the electronic device has a force control system operative to apply the second time-varying charge to the conductive grid for interacting with the stylus for simulating the friction force exhibited by the surface to be simulated.

8. The system of claim 5, wherein:
   the electronic device has a grid control system; and
   the grid control system is operative to disable the touchscreen responsive to proximity of the stylus, and enable the touchscreen to function as the conductive grid for simulating the friction force exhibited by the surface to be simulated.

9. A method for providing stylus tactile feel comprising:
   independently generating, by an active stylus, a first time-varying charge to interact with a second time-varying charge of a conductive grid of an electronic device effective at a working surface of the electronic device, the conductive grid being in an overlying relationship with a touchscreen of the electronic device; and interacting, by the active stylus, with the working surface such that electrostatic force generated between the first time-varying charge and the second time-varying charge simulates friction force, corresponding to an instrument to be simulated and a surface to be simulated, between the active stylus and the working surface.

10. The method of claim 9, wherein:

the second time-varying charge of the conductive grid exhibits a charge profile effective at the working surface of the electronic device; and the first time-varying charge exhibited by the stylus is opposite in polarity to that of the charge profile such that interaction of the first time-varying charge of the stylus and the charge profile provides a tactile feel to a user of the stylus as the stylus is moved relative to the working surface.

11. The method of claim 10, wherein the charge profile is provided of varying intensity along the working surface.

12. The method of claim 10, wherein the charge profile selectively exhibits a change in polarity.

13. The method of claim 10, wherein the charge profile is provided by:

storing information corresponding to multiple charge profiles, each of which corresponds to a friction profile associated with a different surface and instrument combination to be simulated; and providing one of the multiple charge profiles corresponding to the combination to be simulated by the working surface and the stylus.

14. The method of claim 13, wherein providing one of the multiple charge profiles comprises enabling a user of the electronic device to select at least one of the surface to be simulated or the instrument to be simulated.

15. The method of claim 10, further comprising disabling a touchscreen sensor array of the electronic device.

16. The method of claim 15, further comprising applying the charge profile to the touchscreen sensor array.

17. The method of claim 15, wherein disabling the touchscreen sensor array is performed responsive to detecting a proximity of the stylus to the working surface.

* * * * *